US008073620B2

(12) United States Patent
Okamoto (10) Patent No.: US 8,073,620 B2
(45) Date of Patent: Dec. 6, 2011

(54) ON-VEHICLE DISPLAY SYSTEM AND DISPLAY PANEL CONTROL DEVICE

(75) Inventor: Toshiya Okamoto, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 44 days.

(21) Appl. No.: 12/305,002

(22) PCT Filed: Jul. 24, 2007

(86) PCT No.: PCT/JP2007/064501
§ 371 (c)(1),
(2), (4) Date: Dec. 16, 2008

(87) PCT Pub. No.: WO2008/018292
PCT Pub. Date: Feb. 14, 2008

(65) Prior Publication Data
US 2009/0204290 A1 Aug. 13, 2009

(30) Foreign Application Priority Data

Aug. 11, 2006 (JP) .................. 2006-220570

(51) Int. Cl.
*G01C 21/30* (2006.01)
*G08G 1/123* (2006.01)
*H04W 72/00* (2009.01)
*H04N 7/173* (2006.01)
(52) U.S. Cl. .................. 701/211; 340/995.14; 455/454; 725/106; 725/113
(58) Field of Classification Search .................. 701/36, 701/1, 200–226; 340/988–996, 539.25; 342/46, 342/357.21, 357.22, 357.39; 715/737, 738, 715/850, 851, 854, FOR. 207, FOR. 178, 715/972, 756, 716–723, 727, 728; 725/10, 53, 105–118
See application file for complete search history.

(56) References Cited

U.S. PATENT DOCUMENTS

| 5,231,516 | A | * | 7/1993 | Kamon et al. ................ 358/449 |
| 5,305,613 | A | | 4/1994 | Hotta et al. |
| 5,519,410 | A | | 5/1996 | Smalanskas et al. |

(Continued)

FOREIGN PATENT DOCUMENTS

EP  1 800 959 A1  6/2007

(Continued)

OTHER PUBLICATIONS

Okamoto et al.: "Simulation Device, Simulation Program, and Simulation Method," U.S. Appl. No. 11/574,145, filed Feb. 23, 2007.

(Continued)

Primary Examiner — James Trammell
Assistant Examiner — Muhammad Shafi
(74) Attorney, Agent, or Firm — Keating & Bennett, LLP (57) ABSTRACT

An instrument panel display system includes a liquid crystal panel and a liquid crystal controller arranged to generate display data to be inputted into the liquid crystal panel. The liquid crystal controller includes a graphic LSI arranged to autonomously create screen data from imaging data read out from a memory and image data inputted in the graphic LSI, and a control LSI arranged to receive vehicle data and create an imaging operation switching command according to the vehicle data. The graphic LSI creates the screen data in response to the imaging operation switching command, and outputs the screen data as the display data. This configuration can reduce the load on a processor connected to the vehicle network.

11 Claims, 4 Drawing Sheets

U.S. PATENT DOCUMENTS

| | | | |
|---|---|---|---|
| 5,524,446 A | 6/1996 | Hotta et al. | |
| 5,572,881 A | 11/1996 | Hotta et al. | |
| 5,615,080 A | 3/1997 | Nishitani et al. | |
| 5,711,675 A | 1/1998 | Nishitani et al. | |
| 5,764,139 A * | 6/1998 | Nojima et al. | 340/461 |
| 2001/0019363 A1 | 9/2001 | Katta et al. | |
| 2001/0040505 A1 | 11/2001 | Ishida et al. | |
| 2002/0050969 A1 | 5/2002 | Ohura | |
| 2003/0053638 A1 | 3/2003 | Yasuhara | |
| 2004/0160852 A1* | 8/2004 | Sasagawa | 365/233 |
| 2004/0184612 A1* | 9/2004 | Kohiyama et al. | 380/217 |
| 2005/0001714 A1 | 1/2005 | Amari | |
| 2005/0102098 A1* | 5/2005 | Montealegre et al. | 701/209 |
| 2005/0134525 A1 | 6/2005 | Tanghe et al. | |
| 2005/0195273 A1* | 9/2005 | Yamamoto | 348/14.02 |
| 2006/0122742 A1* | 6/2006 | Hasegawa et al. | 701/1 |
| 2007/0025693 A1* | 2/2007 | Shibata et al. | 386/95 |

FOREIGN PATENT DOCUMENTS

| | | |
|---|---|---|
| JP | 62-58110 A | 3/1987 |
| JP | 4-328420 A | 11/1992 |
| JP | 9-153195 A | 6/1997 |
| JP | 10-75437 A | 3/1998 |
| JP | 10-116086 A | 5/1998 |
| JP | 10-297319 A | 11/1998 |
| JP | 11-281375 A | 10/1999 |
| JP | 11-339195 A | 12/1999 |
| JP | 2000-238552 A | 9/2000 |
| JP | 2001-114027 A | 4/2001 |
| JP | 2001-320616 A | 11/2001 |
| JP | 2001-343929 A | 12/2001 |
| JP | 2002-154393 A | 5/2002 |
| JP | 2003-137007 A | 5/2003 |
| JP | 2003-320911 A | 11/2003 |
| JP | 2004-155395 A | 6/2004 |
| JP | 2004-157434 A | 6/2004 |
| JP | 2004-356962 A | 12/2004 |
| JP | 2005-115107 A | 4/2005 |
| JP | 2005-205997 A | 8/2005 |
| JP | 2006-27613 A | 2/2006 |
| JP | 2006-234505 A | 9/2006 |
| WO | 2006/022191 A1 | 3/2006 |
| WO | 2006/022228 A1 | 3/2006 |

OTHER PUBLICATIONS

Okamoto et al.: "Display System," U.S. Appl. No. 12/406,374, filed Mar. 18, 2009.

Nishida: "Diagnostic Support Device and Diagnostic Support System," U.S. Appl. No. 12/296,550, filed Oct. 9, 2008.

Tsubooka et al.: "Instrumental Panel Display System for Mounting on Automobile, and Image Data Output Device," U.S. Appl. No. 12/293,881; filed Sep. 22, 2008.

Okamoto: "Display System, Display System Display Control Method, Data Display Program, and Recording Medium," U.S. Appl. No. 12/296,549, filed Oct. 9, 2008.

Official Communication issued in International Patent Application No. PCT/JP2007/064501, mailed on Sep. 25, 2007.

Okamoto et al.; "Display System"; U.S. Appl. No. 11/574,148, filed Feb. 23, 2007.

* cited by examiner

ON-VEHICLE DISPLAY SYSTEM AND DISPLAY PANEL CONTROL DEVICE

BACKGROUND OF THE INVENTION

1. Field of the Invention

The present invention relates to an on-vehicle display system (e.g., display system for an instrument panel) to be implemented on a moving object that can be controlled, such as vehicles.

2. Description of the Related Art

In recent years, an on-vehicle instrument panel display system, which displays vehicle states such as vehicle speed and engine revolution speed, as well as displays information such as navigation image and CCD picture on a display panel within an instrument panel of vehicles or the like, has been suggested.

Figure 3:
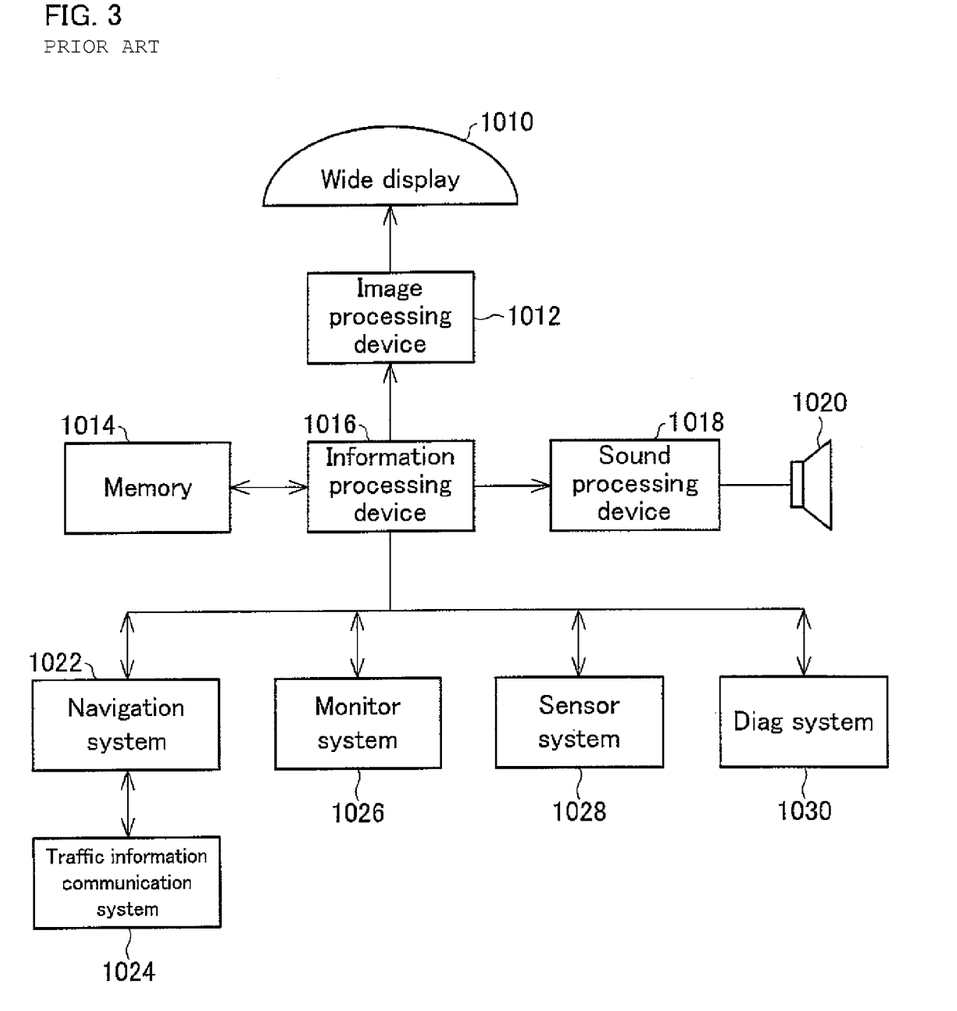
FIG. 3 shows a block diagram of a configuration of a conventional on-vehicle display system.

For example, as shown in FIG. 3, an on-vehicle wide display 1010 disclosed in Japanese Unexamined Patent Application Publication No. 9-123848 is connected with an information processing device 1016, via an image processing device 1012 having a VRAM or the like. The information processing device 1016 includes a CPU that performs predetermined arithmetic processing; a ROM on which a processing program is stored; and I/O interface, connected thereto. Information is provided from a navigation system 1022, a traffic information communication system 1024, a monitoring system 1026, a sensor system 1028, and a diagnostics system 1030 to the information processing device 1016. The information processing device 1016 determines driving conditions based on the above information and receives required information, and then displays various information items on the wide display 1010 via the image processing device 1012.

Figure 4:
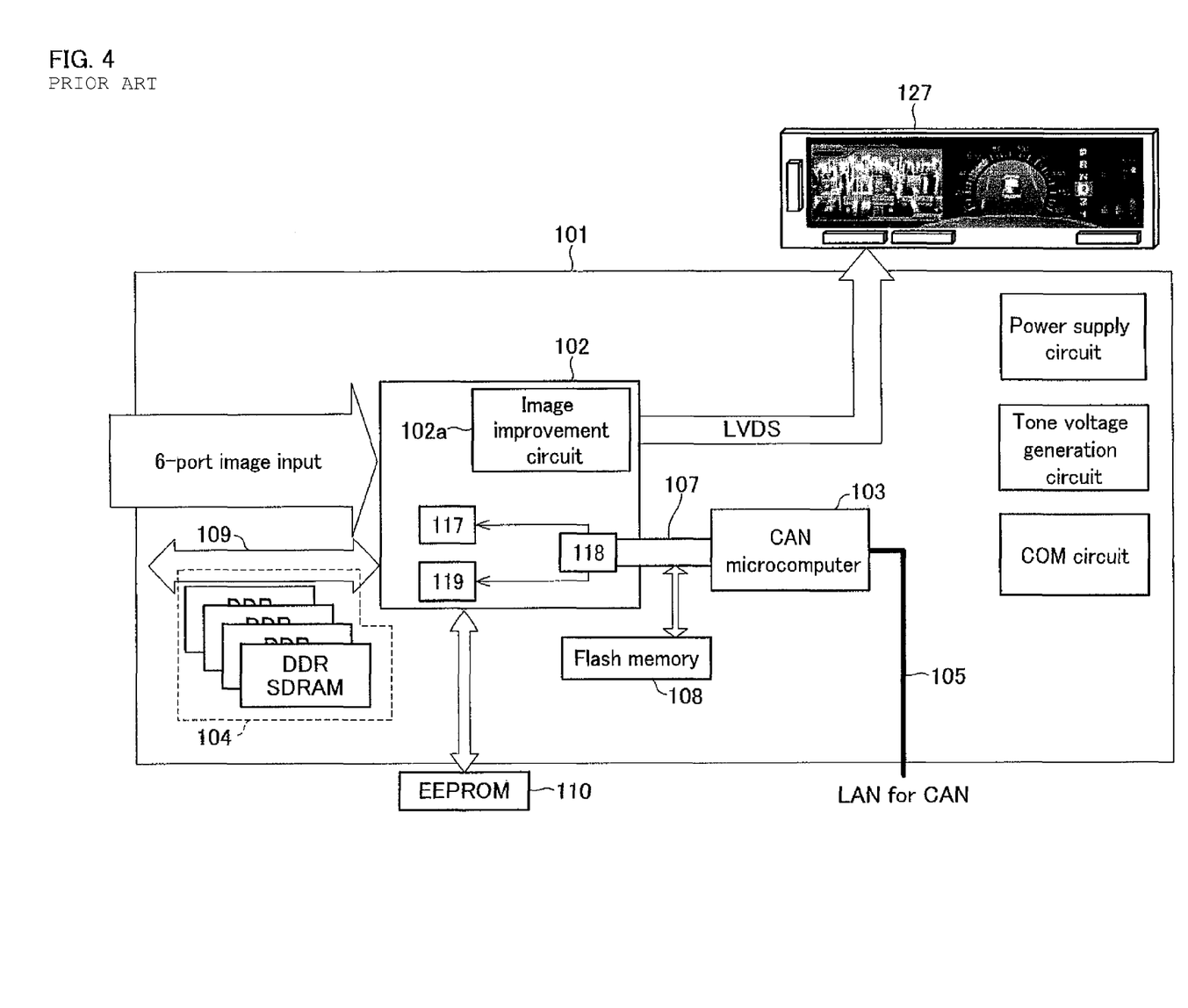
FIG. 4 shows a block diagram of a configuration of a conventional on-vehicle display system.

Furthermore, as shown in FIG. 4, an instrument panel display system disclosed in International Patent Publication, WO 2006/022191 A1 includes an LSI 102, CAN microcomputer 103, and image memory 104, in a display platform section 101 thereof. To the LSI 102, the CAN microcomputer 103 and image memory 104 are connected via CPU buses 107 and 109, respectively. The CAN microcomputer 103 receives information about the vehicle state via a LAN for CAN 105 and then controls the image data processing that is performed in the LSI 102. Also, image data from a port 6 is inputted into the LSI 102. After being subjected to size processing or the like in the LSI 102, the image data is sent to a memory bus (not illustrated), and then stored in the image memory 104. An imaging controller 118, to which the memory bus is connected, is connected to the control bus 107. The control bus 107 is controlled by the CAN microcomputer 103.

In this arrangement, the CAN microcomputer 103 shown in FIG. 4 judges a vehicle state (e.g., speed, engine revolution speed, oil amount, door state, and state of the air conditioner) based on the vehicle data sent from the LAN for CAN. Then, based on the judged vehicle state, the CAN microcomputer 103 judges whether the layout needs to be changed. If the layout needs to be changed, the CAN microcomputer 103 decides the display layout according to the judged vehicle state. And then the CAN microcomputer 103 activates a layout creating program. At this time, the CAN microcomputer 103 activates a layout creating program corresponding to the decided display layout. The program has been read out from a flash memory 108 and deployed on the DRAM in advance. In the flash memory 108, the layout creating programs for creating display layouts of a plurality of patterns are stored by each display layout. The program is deployed onto the DRAM when it is booted.

As explained above, based on the received vehicle data, the CAN microcomputer 103 decides which display layout to use and then activates a layout creating program for creating the decided display layout. At this point, each layout creating program contains at least information of the type of the image to be displayed (e.g., moving images of navigation display and speed meter, and still image of background image); information of the size of the image to be displayed (e.g., 640 pixel×480 pixel); and information of the location of the image to be displayed (e.g., location of a dot at the upper left, and vertical and horizontal length of the image).

Moreover, via the imaging controller 118, the CAN microcomputer 103 commands a Scaler 117 to enlarge or contract the image outputted from DVI, HDCP, or a capture buffer to the predetermined size, based on the information indicating the size of the image (the information contained in the layout creating program). The Scaler 117 enlarges or contracts the image to the demanded size and outputs it to the image memory 104.

Based on the layout creating program, the CAN microcomputer 103 outputs a control signal to a bitblt 119, thereby to cause the bitblt 119 to receive the image data from the image memory 104. The CAN microcomputer 103 also outputs a control signal via the imaging controller 118 to the bitblt 119, thereby to cause the bitblt 119 to create an image on which each image is located in the predetermined location, based on the information of the location of the image (the information contained in the layout creating program). The bitblt 119 creates a piece of image data based on the control signals. In this process, the image data goes through predetermined process via an image improvement 102a, and then is outputted to a liquid crystal panel 127. The liquid crystal panel 127 displays the image according to the image data.

However, the configuration shown in the Japanese Unexamined Patent Application Publication No. 9-123848 imposes a heavy load on the information processing device 1016, because the information processing device 1016 has to judge vehicle state after receiving various information and then display the various information items on the wide display 1010 via the image processing device 1012. And if an error or thermal runaway occurs to the CPU or the like of the information processing device 1016 due to the heavy load, this would result in a problem in which even important information of the vehicle that is required for control (e.g., speed information and warning information) cannot be displayed anymore.

Also, in the configuration shown in the International Patent Publication, WO 2006/022191 A1, there was also a problem in which the CAN microcomputer 103 suffers a heavy load because the CAN microcomputer 103 judges a vehicle state after receiving vehicle data and also creates image data, by using the LSI 102.

SUMMARY OF THE INVENTION

In order to solve the problems described above, preferred embodiments of the present invention provide a configuration that can reduce the load on a processor, which receives vehicle data in the on-vehicle display system.

An on-vehicle display system according to a preferred embodiment of the present invention includes a display panel, and a data generating section arranged to generate display data to be inputted into the display panel, the data generating section including a first processor arranged to autonomously create screen data from imaging data (data for use in imaging operation) read out from a memory and image data inputted in the first processor, and a second processor arranged to receive vehicle data and create an imaging operation switching command according to the vehicle data, the first processor creating the screen data in response to the imaging operation switching command, and outputting the screen data as the display data.

In the above configuration, the first processor autonomously creates screen data from the imaging data read out from the memory and the image data inputted in the first processor, so all the second processor needs to do is to receive vehicle data, create the imaging operation switching command based on the vehicle data, and then issue the imaging operation switching command to the first processor. As a result, the load imposed on the second processor that receives vehicle data can be reduced compared to a conventional configuration. This makes it possible to lower the heating amount and power consumption of the second processor.

The on-vehicle display system may be configured such that the second processor is connected to an in-vehicle network, and the vehicle data is inputted from the in-vehicle network.

The on-vehicle display system may be configured such that the image data contains moving image data.

The on-vehicle display system may be configured such that the imaging data contains an imaging program.

The on-vehicle display system may be configured such that the imaging data contains still image data.

The on-vehicle display system may be configured such that the moving image data contains video picture data obtained from a CCD provided on a vehicle.

The on-vehicle display system may be configured such that the moving image data contains at least one video picture data from the group consisting of navigation, DVD, and TV.

The on-vehicle display system may be configured such that the in-vehicle network is CAN (Controller Area Network), LIN (Local Interconnect network) or FlexRay (registered trademark).

The on-vehicle display system may be configured such that the image data is inputted into the first processor via a network other than the above in-vehicle network.

The on-vehicle display system may be configured such that the first processor includes a graphic LSI and the second processor includes a control LSI.

As explained above, in the display system, the first processor autonomously creates the screen data from the imaging data read out from the memory and the image data inputted in the first processor, so all the second processor needs to do is to receive vehicle data, create the imaging operation switching command based on the vehicle data, and then issue the imaging operation switching command to the first processor. As a result, the load imposed on the second processor that receives vehicle data can be reduced compared to a conventional configuration. This makes it possible to lower the heating value and power consumption of the second processor.

A display panel control device according to a preferred embodiment of the present invention is a display panel control device for controlling an on-vehicle display panel. The display panel control device includes a control processor arranged to receive vehicle data and output an imaging operation switching command corresponding to the vehicle data, and a graphic processor arranged to create screen data from imaging data read out from a memory and image data inputted in the graphic processor, the screen data corresponding to the imaging operation switching command.

The display panel control device may be configured such that the control processor receives the vehicle data from an in-vehicle network.

The display panel control device may be configured such that the image data is inputted into the graphic processor from an in-vehicle network.

An on-vehicle display system (on-vehicle display device) according to a preferred embodiment of the present invention is preferably configured such that it includes a display panel and the above display panel control device.

These and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
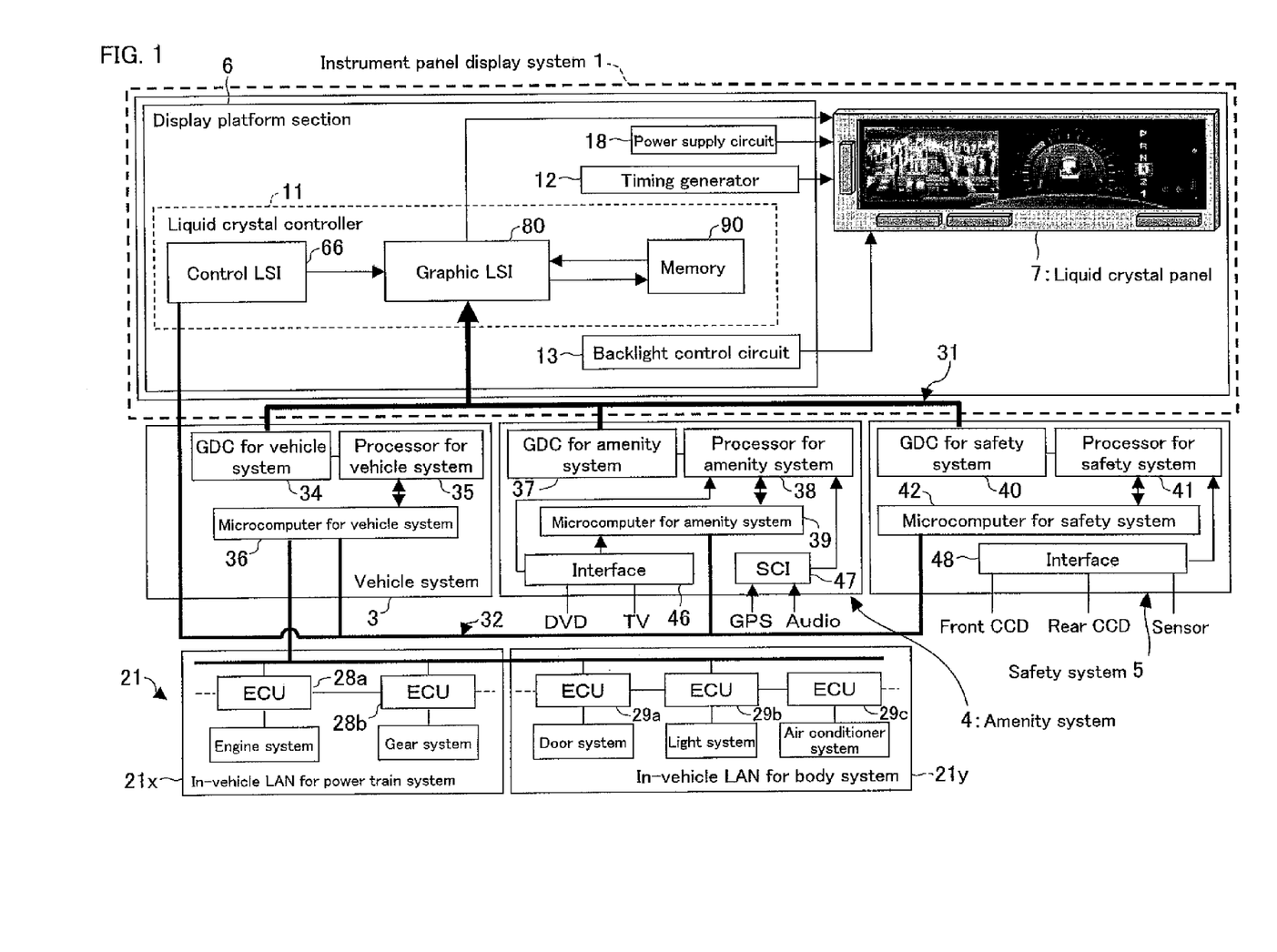
FIG. 1 shows a block diagram of a configuration of an instrument panel control system that includes an instrument panel display system according to a preferred embodiment of the present invention.

A preferred embodiment of the present invention is described below with reference to FIGS. 1 and 2. FIG. 1 shows a block diagram of an instrument panel control system. As described in FIG. 1, the instrument panel control system includes an instrument panel display system 1 (on-vehicle display system); an I/O system (Amenity system 4) for amenity such as DVD, TV, GPS, and Audio; an I/O system (Safety system 5) for safety such as CCDs and sensor; and in-vehicle LAN 21. The in-vehicle LAN 21 includes an in-vehicle LAN for a power train system 21x (hereinafter, power train system in-vehicle LAN 21x) and in-vehicle LAN for a body system 21y (hereinafter, body system in-vehicle LAN 21y). The power train system in-vehicle LAN 21x is connected with an electric control unit (ECU) 28a that controls an engine system, an electric control unit (ECU) 28b that controls gear system, and the like. The body system in-vehicle LAN 21y is connected with an electric control unit (ECU) 29a that controls a door system, an electric control unit (ECU) 29b that controls a light system, an electric control unit (ECU) 29c that controls an air conditioner system, and the like.

The instrument panel display system 1 includes a display platform section 6 and liquid crystal panel 7. The display platform section 6 includes a liquid crystal controller 11 (a section for generating data), power supply circuit 18, timing generator 12, and backlight control circuit 13. The liquid crystal controller 11 includes a control LSI 66 (a second processor, a control processor), graphic LSI 80 (a first processor, a graphic processor), and memory 90.

A vehicle system 3 includes a graphic display controller (GDC) for vehicle system 34 (hereinafter, vehicle system GDC 34), processor (CPU, a processor) for vehicle system 35 (hereinafter, vehicle system processor 35), and microcomputer for vehicle system 36 (hereinafter, vehicle system microcomputer 36) that supports in-vehicle LAN. The amenity system 4 includes a graphic display controller (GDC) for amenity system 37 (hereinafter, amenity system GDC 37), processor (CPU, a processor) for amenity system 38 (hereinafter, amenity system processor 38), and microcomputer for amenity system 39 (hereinafter, amenity system microcomputer 39) that supports in-vehicle LAN. The safety system 5 includes a graphic display controller (GDC) for safety system 40 (hereinafter, safety system GDC 40), processor (CPU, a processor) for safety system 41 (hereinafter, safety system processor 41), and microcomputer for safety system 42 (hereinafter, safety system microcomputer 42) that supports in-vehicle LAN.

In the above configuration, the vehicle system microcomputer 36 is connected to the in-vehicle LAN 21 (power train system in-vehicle LAN 21x and body system in-vehicle LAN 21y). And the control LSI 66 in the display platform section 6, vehicle system microcomputer 36 in the vehicle system 3, amenity system microcomputer 39 in the amenity system 4, and safety system microcomputer 42 in the safety system 5 are connected to an in-vehicle LAN 32, the LAN for CAN.

Also, the vehicle system GDC 34, amenity system GDC 37, safety system GDC 40, and graphic LSI 80 in the display platform section 6 are connected to an in-vehicle LAN 31 that is used for transmitting image data. The in-vehicle LAN 31 is a high-speed LAN (e.g., MOST, IDB1394) or direct connection of signals.

The in-vehicle LAN 21, vehicle system 3, amenity system 4, safety system 5, and instrument panel section 2 are described below in terms of their functions.

The power train system in-vehicle LAN 21x of the in-vehicle LAN 21 is connected with the ECU for engine system 28a (hereinafter, engine system ECU 28a), ECU for gear system 28b (hereinafter, gear system ECU 28b), and the like. The engine system ECU 28a performs transmission of numeric data about engine control and numeric data about the engine, and reception of control data from the other ECU. The gear system ECU 28b performs transmission of numeric data about gear control and numeric data about the gear, and reception of control data from the other ECU. And, the power train system in-vehicle LAN 21x transmits real-time data (that is required to be sent in real time with high credibility, such as data about warning information, blinkers, speed, and revolution speed) to the vehicle system microcomputer 36 of the vehicle system 3, as vehicle data.

The body system in-vehicle LAN 21y of the in-vehicle LAN 21 is connected with the ECU for door system 29a (hereinafter, door system ECU 29a), ECU for light system 29b (hereinafter, light system ECU 29b), ECU for air conditioner system 29c (hereinafter, air conditioner system ECU 29c), and the like. The door system ECU 29a performs transmission of switching signals to open or close the door and reception of control data from the other ECU. The light system ECU 29b performs transmission of signals to switch on or off the light and reception of control data from the other ECU. The air conditioner system ECU 29c performs transmission of data about air conditioner control and data about the air conditioner, and reception of control data from the other ECU. And, the body system in-vehicle LAN 21y transmits data (that can be transmitted at low speed without any problem, such as data about light, opening or closing the door, and controlling the air conditioner) to the vehicle system microcomputer 36 of the vehicle system 3, as vehicle data.

The vehicle system microcomputer 36 of the vehicle system 3 is a micro controller that includes an interface for CAN (or the other vehicle-specific LAN, such as LIN and FlexRay).

The vehicle system microcomputer 36 receives various vehicle data (the vehicle data of power train system and body system), and then sends the data to the vehicle system processor 35.

Also, the vehicle system microcomputer 36 sends the various vehicle data, which is received from the in-vehicle LAN 21 (the data about go straight, stop, turn right, turn left, go back, driving speed, or the like), to the amenity system microcomputer 39, to the safety system microcomputer 42, and to the control LSI 66 of the display platform section 6, via the in-vehicle LAN 32 (CAN).

After receiving various vehicle data sent via the vehicle system microcomputer 36, the vehicle system processor 35 of the vehicle system 3 controls the vehicle system GDC 34 so as to generate image data (moving image data of the speed meter, tachometer, or the like). In this step, the vehicle system GDC 34 performs an imaging operation to prepare image data of two or three-dimensional graphics in response to a command from the vehicle system processor 35, and then sends out the generated image data to the in-vehicle LAN 31.

The amenity system microcomputer 39 of the amenity system 4 is a microcontroller that includes an interface for CAN (or the other vehicle-specific LAN such as LIN and FlexRay). The amenity system microcomputer 39 receives the vehicle data sent from the vehicle system microcomputer 36 via the in-vehicle LAN 32, and then sends the data to the amenity system processor 38.

After receiving either data sent from a DVD or TV via an interface 46 or data sent from a GPS or audio sent via an SCI 47; and vehicle data sent from the amenity system microcomputer 39, the amenity system processor 38 of the amenity system 4 controls the amenity system GDC 37 so as to generate image data (moving image data for navigation image, TV image, DVD image, or the like). The image data for a navigation image is generated by the amenity system processor 38, by using a combination of map data from DVD and vehicle location information from GPS. In this step, the amenity system GDC 37 performs imaging operation to prepare image data of two or three-dimensional graphics in response to a command from the amenity system processor 38, and then sends out the generated image data to the in-vehicle LAN 31.

The safety system microcomputer 42 of the safety system 5 is a microcontroller that includes an interface for CAN (or the other vehicle-specific LAN such as LIN and FlexRay). The safety system microcomputer 42 receives the vehicle data sent from the vehicle system microcomputer 36 via the in-vehicle LAN 32, and then sends the data to the safety system processor 41.

After receiving data sent from a front CCD, a rear CCD, and the other sensors, via an interface 48; and vehicle data sent via the safety system microcomputer 42, the safety system processor 41 of the safety system 5 controls the safety system GDC 40 so as to generate image data (moving image data for each CCD image or the like). More specifically, the safety system processor 41 performs safety detection processes such as obstacle detection and white line detection, by using data inputted from each CCD, and then generates warning image data of obstacles or the like. In this step, the safety system GDC 40 performs imaging operation to prepare image data of two or three-dimensional graphics in response to a command from the safety system processor 41, and then sends out the generated image data to the in-vehicle LAN 31.

The control LSI 66 of the instrument panel display system 1 is a microcontroller that includes an interface for CAN. The control LSI 66 receives the vehicle data sent out from the vehicle system microcomputer 36 to the in-vehicle LAN 32 and creates an imaging operation switching command based on the received vehicle data, and then sends out the imaging operation switching command to the graphic LSI 80.

The liquid crystal panel 7 of the instrument panel display system 1 preferably is a liquid crystal panel module that includes a driver IC and backlight. The timing generator 12 generates a signal that is specific for the liquid crystal panel. The backlight control circuit 13 controls the backlight of the liquid crystal panel 7. The power supply circuit 18 provides the liquid crystal panel 7 with power supply voltage. The memory 90 is used as a storage area for the imaging data (i.e., data for use in the imaging operation), and also as a working area for the graphic LSI 80 to perform image processing or the like (explained later). Note that at least a portion of the memory 90 may be set within the graphic LSI 80.

The liquid crystal controller 11 of the instrument panel section display system 1 (display panel control device) outputs display data to the liquid crystal panel 7. That is, the liquid crystal controller 11 receives vehicle data from the in-vehicle LAN 32 and generates data for a screen based on the various image data generated in such systems as the vehicle system 3, amenity system 4, and safety system 5. In addition, the liquid crystal controller 11 optimizes the screen data (image improvement) according to the characteristics of the liquid crystal panel 7, and then outputs the data to the liquid crystal panel 7 as display data.

Hereinafter the liquid crystal controller 11 is described more precisely.

Figure 2:
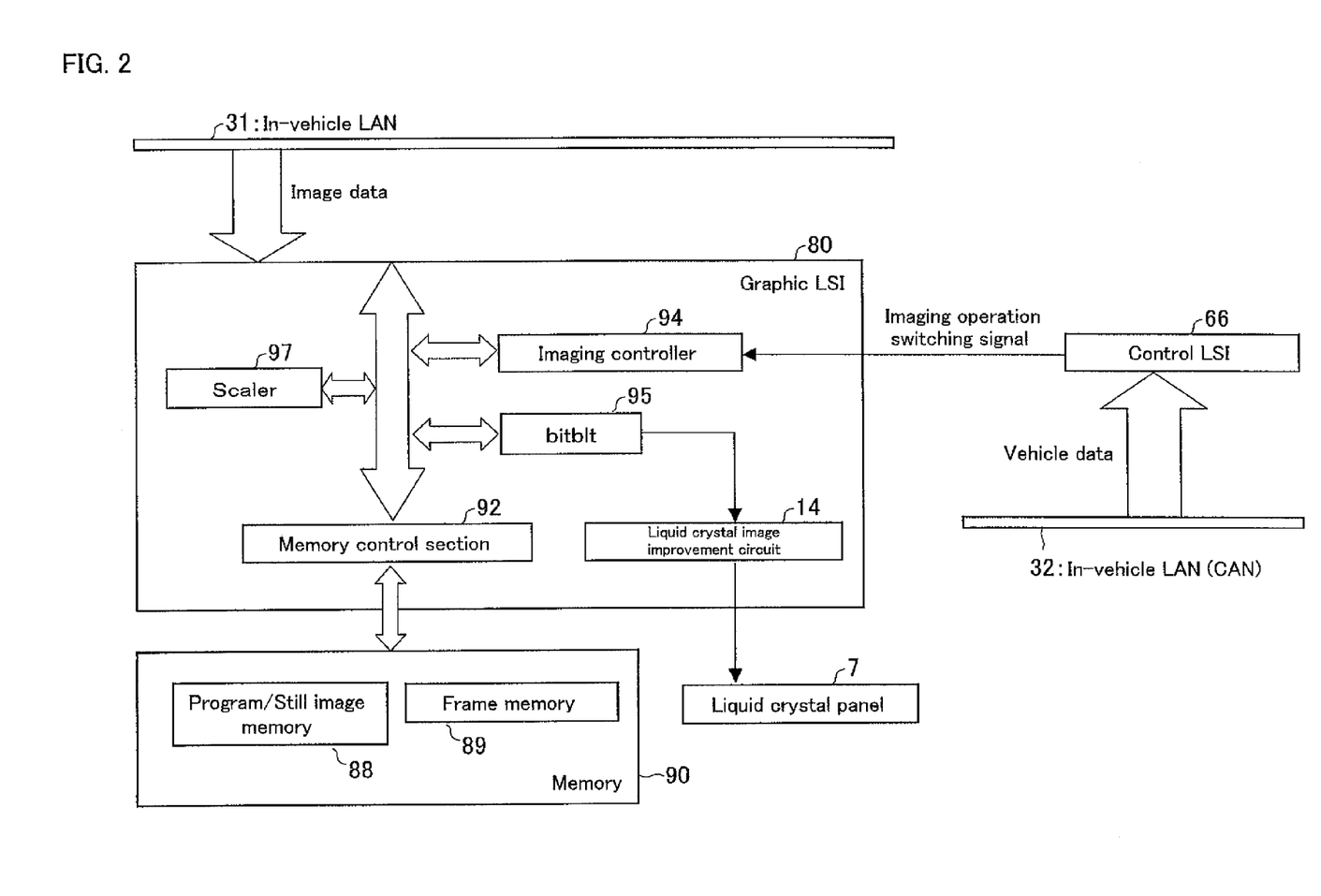
FIG. 2 shows a block diagram of a configuration of a liquid crystal controller that is provided in the instrument panel display system.

As shown in FIGS. 1 and 2, the display platform section 6 includes the control LSI 66, graphic LSI 80, and memory 90 (a program/still image memory 88 and a frame memory 89).

The control LSI 66 creates an imaging operation switching command (a display switching command) after extracting vehicle data (warnings about vehicle speed, engine revolution speed, whether the seatbelt is fastened or not, whether the door is closed or opened, or the like) from the in-vehicle LAN 32 via a CAN interface (not illustrated), and then outputs the command to the graphic LSI 80. At this point, the imaging operation switching command is issued as a single command directed to a single screen (e.g., a screen on which images of objects such as meter, oil, shift lever, CCD, navigation are arranged).

In response to the imaging operation switching command issued by the control LSI 66, the graphic LSI 80 creates screen data by performing imaging operation to allocate image data of each object in appropriate locations. Then, the graphic LSI 80 outputs the data to the liquid crystal panel 7 as display data. In other words, the graphic LSI 80 includes a port, from which moving images (images of CCD, navigation, DVD, TV or the like) can be inputted, while the graphic LSI 80 is connected to the memory 88, in which imaging data (imaging program for preparing still images such as background and each object) is stored; and to the memory 89, which is a transient memory for the imaging operation. This makes it possible for the graphic LSI 80 to prepare image data while receiving and sending the data from/to the memories 88 and 89 in response to the imaging operation switching command.

On the liquid crystal controller 11, first, the control LSI 66 judges the vehicle state based on the vehicle information sent from the LAN for CAN 32. The vehicle state represents all the states indicating information about the vehicle (e.g., all kinds of vehicle-related information such as speed, engine revolution speed, oil amount, door state, and state of air conditioner).

Next, based on the judged vehicle state, the control LSI 66 judges whether the imaging operation needs to be switched. And if the imaging operation needs to be switched, the control LSI 66 issues an imaging operation switching command to the graphic LSI 80. For example, if the control LSI 66 judges that a vehicle that has been driving has just stopped, the display at driving state needs to be switched to the display at stopping state, and so the control LSI 66 issues an imaging operation switching command for switching the display.

Once the imaging operation switching command has been received, the graphic LSI 80 reads out, from the memory 88, a layout creating program corresponding to the imaging operation switching command. In the memory 88, layout creating programs for creating a plurality of patterns of display layouts are stored by each imaging operation switching command. Each layout creating program preferably contains at least information about the type of the object to be displayed, size of the object to be displayed (e.g., 640 pixel×480 pixel), and location of the object to be displayed (e.g., a location of a dot at the upper left, and vertical and horizontal length of the image). The program may contain image data of the object that is to be displayed as a still image, such as background.

Then, based on the information about the size of the object contained in the layout creating program, an imaging controller 94 commands a Scaler 97 to enlarge or contract an image outputted from DVI, HDCP, or capture buffer, to the predetermined size. The Scaler 97 enlarges or contracts the image to the predetermined size, and then outputs it to the frame memory 89.

And then, based on the layout creating program, the imaging controller 94 outputs a control signal to a bitblt 95, thereby to cause the bitblt 95 to receive the image data of each object from the memory 90 (88, 89) and place the objects in the predetermined locations, and then create a screen. The bitblt 95 then creates a screen data indicating a piece of screen, based on the control signal. The screen data goes through a prescribed process via a liquid crystal image improvement circuit 14, and then is outputted to the liquid crystal panel 7 as display data. The liquid crystal panel 7 displays the image based on the display data.

As described above, with the instrument panel display system, all the control LSI 66 needs to do is to receive vehicle data from the LAN 32 and then issue an imaging operation switching command per screen to the graphic LSI 80. This makes it possible to considerably reduce the amount of data to be sent from the control LSI 66 to the graphic LSI 80. For example, the amount of the data can be much less than that sent from the CAN microcomputer 103 to the LSI 102 in FIG. 4. This process can reduce the load on the control LSI 66 and also can reduce heat value and power consumption of the control LSI 66.

Moreover, the instrument panel display system 1 includes the processors 35, 38, and 41 corresponding to the information about vehicle, amenity, and safety, respectively. Each processor generates image data that is assigned to each of them. As a result, the processing loads on the each processor (vehicle system processor 35, amenity system processor 38, and safety system processor 41) are reduced compared to a conventional configuration, in which the loads are imposed on one single processor. Furthermore, a processor that has a function or capability to handle assigned information may also be used as the vehicle system processor 35, amenity system processor 38, or safety system processor 41. This makes it possible to improve display stability as well as to reduce the cost of manufacturing.

The present invention is not limited to the description of the preferred embodiments described above, but may be altered within the scope of the claims. A preferred embodiment based on a suitable combination of technical features disclosed in different preferred embodiments is encompassed in the technical scope of the invention.

A display system according to preferred embodiments of the present invention can be used widely as an information display system of vehicles, trains, aircrafts, vessels, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An on-vehicle display system comprising:
a display panel; and
a data generating section arranged to generate display data to be inputted into the display panel, the data generating section including:
a plurality of image data generating processors arranged to generate respective image data of images which are different from each other;
a first processor arranged to generate the display data; and
a second processor arranged to receive vehicle data indicative of a vehicle running condition and to create an imaging operation switching command according to the vehicle data; wherein
the plurality of image data generating processors autonomously generate the respective image data without depending on the imaging operation switching command; and
the first processor is arranged to generate the display data by combining, according to the imaging operation switching command, the respective image data generated by the plurality of image data generating processors.

2. The on-vehicle display system according to claim 1, wherein the second processor is connected to an in-vehicle network, and the vehicle data is inputted from the in-vehicle network.

3. The on-vehicle display system according to claim 2, wherein the in-vehicle network is one of a Controller Area Network, a Local Interconnect Network, or a FlexRay.

4. The on-vehicle display system according to claim 3, wherein the image data is inputted into the first processor via a network other than the in-vehicle network.

5. The on-vehicle display system according to claim 1, wherein the image data contains moving image data.

6. The on-vehicle display system according to claim 5, wherein the moving image data contains video picture data obtained from a CCD provided on a vehicle.

7. The on-vehicle display system according to claim 5, wherein the moving image data contains at least one video picture data from the group consisting of a navigation unit, a DVD, and a TV.

8. The on-vehicle display system according to claim 1, wherein the first processor generates the display data according to a drawing program read out from a memory, the respective image data generated by the plurality of image data generating processors, and the imaging operation switching command.

9. The on-vehicle display system according to claim 8, wherein the imaging data contains still image data.

10. The on-vehicle display system according to claim 1, wherein the first processor includes a graphic LSI and the second processor includes a control LSI.

11. The on-vehicle display system according to claim 1, wherein the plurality of image data generating processors include:
a vehicle system processor arranged to generate image data indicative of the vehicle running condition;
an amenity system processor arranged to generate image data of at least one of a navigation image, a DVD image, and a TV image; and
a safety system processor arranged to generate image data of at least one of a vehicle surrounding image captured by an on-vehicle camera and an image indicative of vehicle safety information detected according to the vehicle surrounding image.

* * * * *